(12) United States Patent
McClendon et al.

(10) Patent No.: US 9,759,307 B1
(45) Date of Patent: Sep. 12, 2017

(54) STEERING ASSEMBLY HAVING AN INJECTED ISOLATOR

(71) Applicant: STEERING SOLUTIONS IP HOLDING CORPORATION, Saginaw, MI (US)

(72) Inventors: Kevin M. McClendon, Saginaw, MI (US); Niklaus A. von Matt, Midland, MI (US); Paul E. Kern, Reese, MI (US); Casey M. Bentoski, Otisville, MI (US); Jeffrey H. Krueger, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/069,238

(22) Filed: Mar. 14, 2016

(51) Int. Cl.
*B62D 5/04* (2006.01)
*F16H 57/028* (2012.01)
*F16H 57/00* (2012.01)
*F16H 57/12* (2006.01)

(52) U.S. Cl.
CPC ......... *F16H 57/028* (2013.01); *B62D 5/0421* (2013.01); *B62D 5/0448* (2013.01); *F16H 57/0006* (2013.01); *F16H 57/12* (2013.01)

(58) Field of Classification Search
CPC .... F16H 57/028; F16H 57/0006; F16H 57/12; B62D 5/0421; B62D 5/0448
See application file for complete search history.

(56) References Cited

U.S. PATENT DOCUMENTS

| | | | | |
|---|---|---|---|---|
| 8,307,940 B2* | 11/2012 | Bugosh | ............... | B62D 5/0448 180/443 |
| 8,955,640 B2* | 2/2015 | Ishikawa | ............... | B62D 5/061 180/428 |
| 9,290,199 B2* | 3/2016 | Bando | .................. | B62D 5/0448 |
| 2011/0127742 A1* | 6/2011 | Bae | ...................... | B62D 5/0448 280/93.513 |
| 2012/0043156 A1* | 2/2012 | Ishige | .................. | B62D 5/0409 180/444 |
| 2016/0298745 A1* | 10/2016 | Jonas | ..................... | F16H 48/40 |

* cited by examiner

*Primary Examiner* — Kevin Hurley
*Assistant Examiner* — Marlon A Arce
(74) *Attorney, Agent, or Firm* — Cantor Colburn LLP

(57) ABSTRACT

A steering assembly includes a rack assembly coupled to a road wheel. The rack assembly includes a housing, a ball screw, a bearing, and a retainer. The housing defines an injection port. The ball screw is at least partially received within the housing. The bearing is received within the housing and rotatably supports the ball screw. The retainer is received within the housing and includes a first retainer portion and a second retainer portion. The first retainer portion cooperates with the housing. The second retainer portion extends from the first retainer portion and is spaced apart from the housing. The second retainer portion defines a channel. The channel, the second retainer portion, and a surface of the housing defines an injection pocket.

20 Claims, 2 Drawing Sheets

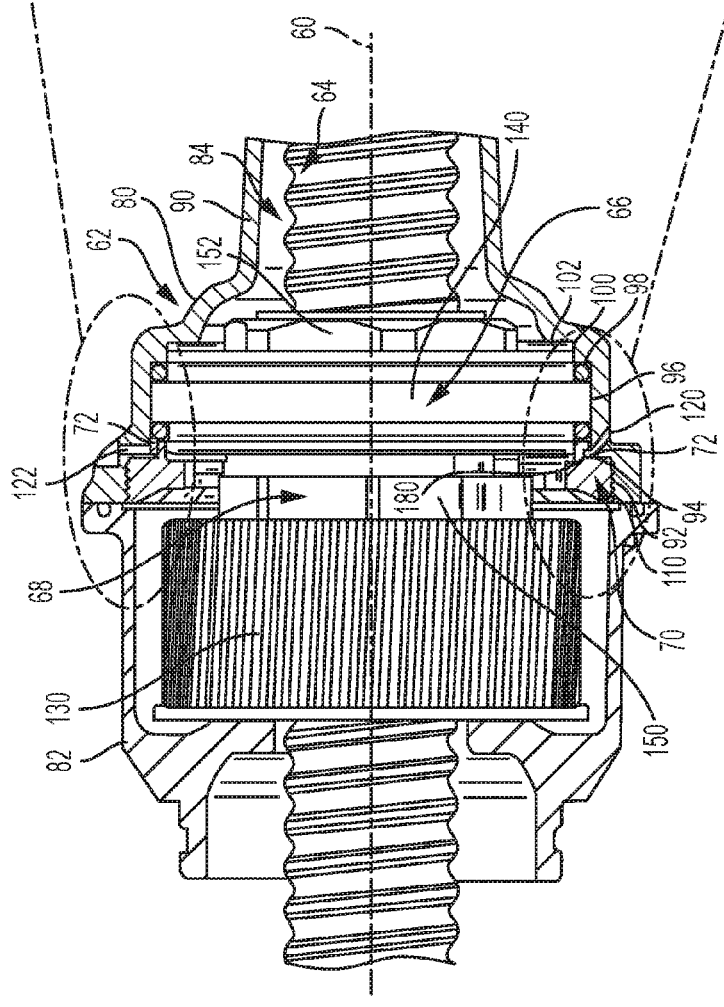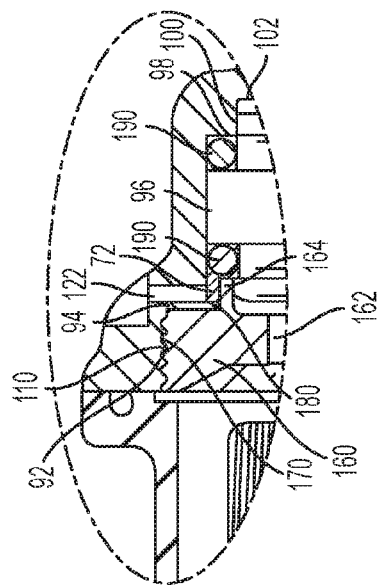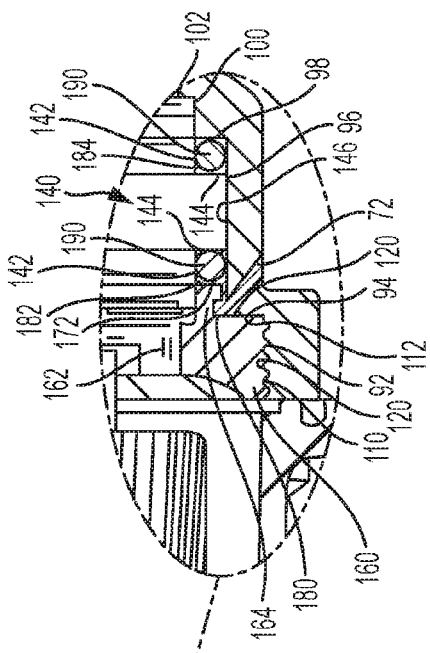

STEERING ASSEMBLY HAVING AN INJECTED ISOLATOR

BACKGROUND OF THE INVENTION

The present invention relates to a steering assembly having an injected component.

During assembly of steering assemblies component tolerances and build variations may affect the fit and/or performance of the steering assembly. The existing build variation and a variation of a predetermined preload on various components of the steering assembly may cause misalignment of components. The misalignment of components may add friction, noise, or a decrease in mechanical efficiency of the steering assembly.

SUMMARY OF THE INVENTION

According to an embodiment of the present invention, a steering assembly is provided. The steering assembly includes a rack assembly coupled to a road wheel. The rack assembly includes a housing, a ball screw, a bearing, and a retainer. The housing defines an injection port. The ball screw is at least partially received within the housing. The bearing is received within the housing and rotatably supports the ball screw. The retainer is received within the housing and includes a first portion and a second portion. The first portion cooperates with the housing. The second portion extends from the first portion and is spaced apart from the housing. The second portion defines a channel. The channel, the second portion, and a surface of the housing defines an injection pocket.

According to another embodiment of the present invention, a rack assembly that is provided with a steering assembly is provided. The rack assembly includes a housing, a ball nut, a bearing, and a retainer. The housing has a first step surface extending from a first surface towards a second surface. The housing has a bearing shoulder extending from the second surface. The housing defines an injection port extending through at least one of the first step surface and the second surface. The ball nut is disposed on a ball screw that extends to the housing. The bearing is disposed about the ball nut and includes an outer race that engages the bearing shoulder. The retainer is disposed about the ball nut. The retainer includes a first portion, and inner portion, and a second portion. The first portion engages the first surface and the first step surface. The inner portion extends radially from the first portion towards the ball nut. The inner portion engages the ball nut and the outer race. The second portion extends axially from the first portion. The second portion engages the outer race and is spaced apart from the second surface. The first portion, the second portion, the first step surface, and the second surface defines an injection pocket.

According to yet another embodiment of the present invention, a rack assembly that is provided with a steering assembly is provided. The rack assembly includes a housing and a retainer. The housing has a first step surface extending from a first surface towards a second surface. Housing as a chamfered region extending between the first step surface and the second surface. The housing defines an injection port extending through the chamfered region. The retainer is disposed within the housing and includes a first portion, and inner portion and a second portion. The first portion engages the first surface and the first step surface. The inner portion extends radially from the first portion towards a ball nut disposed about a ball screw. The second portion extends axially from the first portion. The second portion engages a bearing disposed within the housing. The second portion is spaced apart from the second surface. The first portion and the second portion define a channel and the channel, the second portion, the chamfered region, and the second surface define an injection pocket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is a partial cross-sectional view of the steering assembly along section line 2-2;

FIG. 3 is a partial cross-sectional view of a rack assembly; and

FIG. 4 is a partial cross-sectional view of the rack assembly.

DETAILED DESCRIPTION

Figure 1:
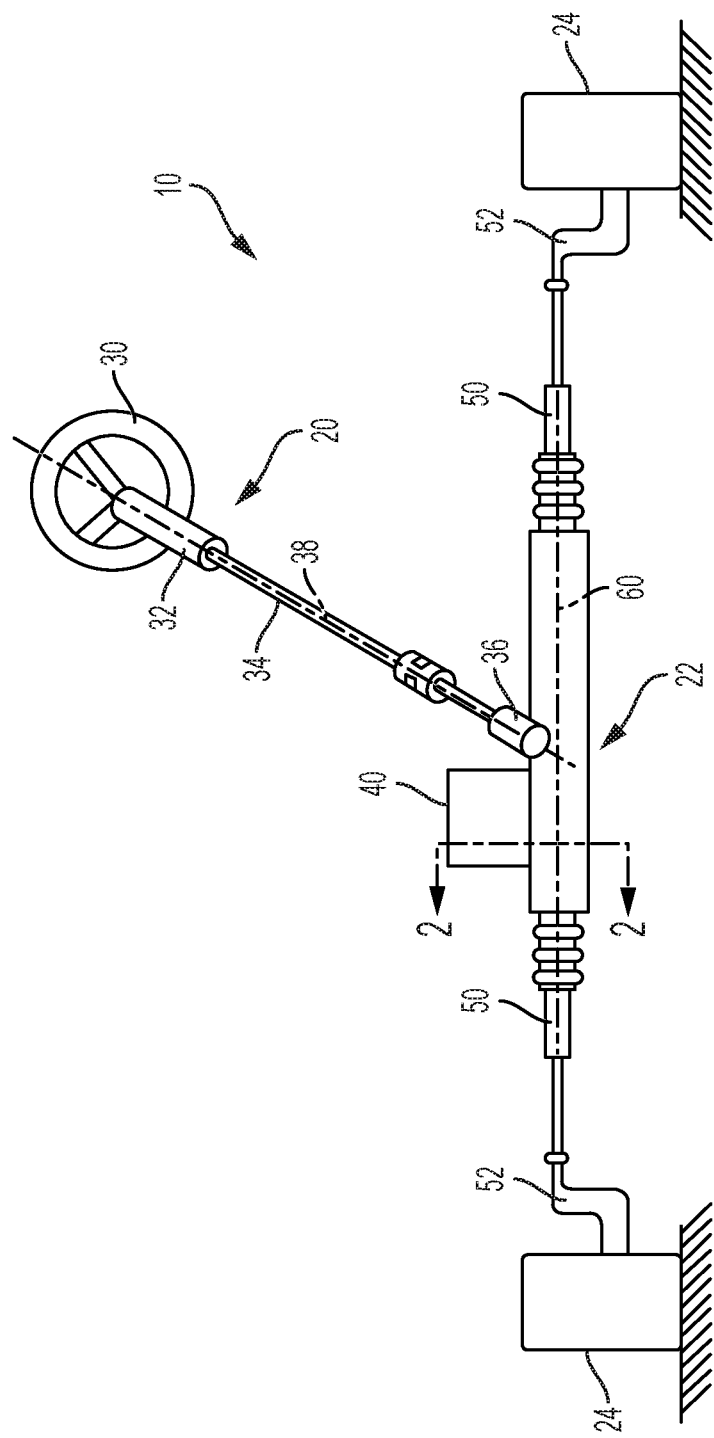
FIG. 1 is an illustration of a steering assembly.

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a steering assembly 10 is shown. The steering assembly 10 may be provided with a vehicle. The steering assembly 10 includes a steering column assembly 20 and a rack assembly 22. The steering column assembly 20 receives a driver directional input that is subsequently applied to the rack assembly 22 that is configured to pivot at least one vehicle road wheel 24.

The steering column assembly 20 includes a steering wheel 30 operatively coupled to a steering column 32 and a steering shaft 34 operatively connected to the rack assembly 22 through a gear mechanism 36. The steering shaft 34 extends through the steering column 32 along a steering column axis 38. The steering shaft 34 is directly or indirectly coupled to the steering wheel 30. In at least one embodiment, the steering assembly 10 is configured as a steer by wire system such that the steering wheel 30 is electrically coupled to the steering shaft 34. A device such as a rotary encoder may be provided that interprets rotation of the steering wheel 30 and applies the information to an actuator that rotates the steering shaft 34 connected to the gear mechanism 36. The rotation of the steering shaft 34 actuator rotates the gear mechanism 36 to actuate the rack assembly 22 to pivot the at least one vehicle road wheel 24.

The gear mechanism 36 is coupled to the rack assembly 22. The gear mechanism 36 includes a pinion gear in communication with the rack assembly 22. A drive motor assembly 40 is in communication with the rack assembly 22. The drive motor assembly 40 is part of a power steering assist system to aid a driver of the vehicle in steering/ repositioning at least one vehicle road wheel 24. The drive motor assembly 40 applies an assistance load to the rack assembly 22 through a drive or pulley mechanism.

The rack assembly 22 is operatively coupled to the at least one vehicle road wheel 24. The rack assembly 22 is coupled to the at least one vehicle road wheel 24 through a tie rod 50 connected to an end of the rack assembly 22. The tie rod 50 is operatively coupled to a steering knuckle 52 connected to the at least one vehicle road wheel 24. The rack assembly 22, in response to rotation of the steering wheel 30, translates, pivots, or actuates the tie rod 50 to pivot or rotate the steering knuckle 52 and ultimately the at least one vehicle road wheel 24.

The rack assembly 22 extends along a longitudinal axis 60. The longitudinal axis 60 is disposed substantially perpendicular or transverse to the steering column axis 38.

Referring to FIGS. 2 through 4, the rack assembly 22 includes a housing 62, a ball screw 64, a bearing 66, a ball nut 68, a retainer 70, and an injected component 72. The housing 62 may be configured as a two-piece housing having a first housing portion 80 joined to a second housing portion 82. The first housing portion 80 and the second housing portion 82 may be joined to each other by a variety of methods such as welding, brazing, a fastener, or the like. The first housing portion 80 and the second housing portion 82 to cooperate with each other to define a cavity 84 that receives various components of the rack assembly 22 and the drive motor assembly 40.

The first housing portion 80 includes a wall 90 having a plurality of interior surfaces. The wall 90 includes a first surface 92, a first step surface 94, a second surface 96, a second step surface 98, a third surface 100, and a third step surface 102. The first surface 92 is disposed proximate the second housing portion 82. The first surface 92 is disposed substantially parallel to the longitudinal axis 60. The first surface 92 defines a plurality of threads 110.

The first step surface 94 extends from the first surface 92 towards the second surface 96. The first step surface 94 is disposed substantially perpendicular to the first surface 92. The first step surface 94 is disposed substantially perpendicular to the longitudinal axis 60. The first step surface 94 is disposed substantially perpendicular to the second surface 96. The first step surface 94 extends between the first surface 92 and the second surface 96. In at least one embodiment, a chamfered region 112 extends between the first step surface 94 and the second surface 96.

The second surface 96 is disposed substantially perpendicular to the first step surface 94. The second surface 96 is disposed substantially parallel to the longitudinal axis 60. The second surface 96 extends from the first step surface 94 towards the second step surface 98. The combination of the first surface 92, the first step surface 94, and the second surface 96 define a retainer shoulder.

The second step surface 98 is disposed substantially perpendicular to the second surface 96. The second step surface 98 is disposed substantially perpendicular to the longitudinal axis 60. The second step surface 98 extends from the second surface 96 towards the third surface 100.

The third surface 100 is disposed substantially perpendicular to the second step surface 98. The third surface 100 is disposed substantially parallel to the longitudinal axis 60. The third surface 100 extends between the second step surface 98 and the third step surface 102.

The third step surface 102 extends from the third surface 100. The third step surface 102 is disposed substantially perpendicular to the third surface 100. The third step surface 102 is disposed substantially perpendicular to the longitudinal axis 60. The combination of the second step surface 98, the third surface 100, and the third step surface 102 define a bearing shoulder that extends from the second surface 96.

The first housing portion 80 of the housing 62 defines an injection port 120 and an overflow port 122. The injection port 120 extends through the wall 90. The injection port 120 extends through at least one of the first step surface 94 and the second surface 96. In at least one embodiment, the injection port 120 extends through the chamfered region 112 that extends between the first step surface 94 and the second surface 96.

The injection port 120 is disposed at an acute angle relative to the longitudinal axis 60. The injection port 120 is disposed at an angle between an angle in which the injection port 120 is disposed substantially parallel to the longitudinal axis 60 and an angle in which the injection port 120 is disposed substantially perpendicular to the longitudinal axis 60.

The overflow port 122 is radially spaced apart from the injection port 120. In at least one embodiment, the overflow port 122 is diametrically opposed to the injection port 120. The overflow port 122 extends through the wall 90. The overflow port 122 extends through the second surface 96. The overflow port 122 is disposed substantially perpendicular to the longitudinal axis 60. The overflow port 122 is disposed substantially parallel to the first step surface 94.

The second housing portion 82 of the housing 62 receives a pulley 130 of the drive motor assembly 40. The pulley 130 is spaced apart from a joint between the first housing portion 80 and the second housing portion 82.

The ball screw 64 is at least partially received within the cavity 84 of the housing 62. The ball screw 64 extends along the longitudinal axis 60. The ball screw 64 is configured as a rotary member such as a rack having a ball screw profile. In at least one embodiment, a ball screw 64 runs parallel to a rack and drives the rack.

The bearing 66 is received within the cavity 84 of the housing 62. The bearing 66 rotatably supports the ball screw 64. The bearing 66 is a supported by the first housing portion 80 of the housing 62. The bearing 66 is disposed about the ball screw 64.

The bearing 66 includes an outer race 140. The outer race 140 engages the bearing shoulder. In at least one embodiment, the outer race 140 engages the second surface 96, the third surface 100, and the third step surface 102. The outer race 140 includes an outer surface 142, a pair of side surfaces 144, and a top surface 146. The pair of side surfaces 144 extend from the outer surface 142 towards the top surface 146. The top surface 146 extend between the pair of side surfaces 144. The top surface 146 engages the second surface 86.

The ball nut 68 is disposed about the ball screw 64. The ball nut 68 is coupled to the ball screw 64 and extends through the bearing 66. The ball nut 68 includes a first ball nut portion 150 and a second ball nut portion 152. The first ball nut portion 150 is disposed proximate the pulley 130 of the drive motor assembly 40. The first ball nut portion 150 engages the pulley 130 of the drive motor assembly 40. The first ball nut portion 150 is radially spaced apart from an interior surface of the housing 62.

The second ball nut portion 152 extends from the first ball nut portion 150. The second ball nut portion 152 is radially spaced apart from an interior surface of the housing 62.

The retainer 70 is received within the cavity 84 of the housing 62. The retainer 70 is disposed about the ball nut 68. The retainer 70 is disposed about the first ball nut portion 150. The retainer 70 is configured as a retainer nut, a snap ring, a threaded ring, or a non-threaded ring. The retainer 70 includes a first retainer portion 160, an inner retainer portion 162, and a second retainer portion 164.

The first retainer portion 160 cooperates with an inner surface of the housing 62. The first retainer portion 160 engages the first surface 92 and the first step surface 94. In at least one embodiment, the first retainer portion 160 engages the retainer shoulder. The first retainer portion 160 is provided with a plurality of external threads 170. The plurality of external threads 170 are configured to engage the plurality of threads 110 of the first surface 92.

The inner retainer portion 162 extends radially from the first retainer portion 160 towards the ball nut 68. The inner retainer portion 162 extends radially from the first retainer portion 160 towards the longitudinal axis 60. The inner retainer portion 162 engages the bearing 66 and the ball nut 68.

The second retainer portion 164 extends axially from the first retainer portion 160. The second retainer portion 164 extends axially from the first retainer portion 160 along the longitudinal axis 60. The second retainer portion 164 engages the outer race 140 of the bearing 66. The second retainer portion 164 is spaced apart from an inner surface of the wall 90. The second retainer portion 164 is spaced apart from the second surface 96.

An end 172 of the second retainer portion 164 faces towards the pair of side surfaces 144 of the outer race 140 of the bearing 66. The end 172 of the second retainer portion 164, the outer surface 142 of outer race 140 of the bearing 66, a side surface of the pair of side surfaces 144 of the outer race 140 of the bearing 66, and the second surface 96 define a first seal gland 182. The outer surface 142 of outer race 140 of the bearing 66, a side surface of the pair of side surfaces 144 of the outer race 140 of the bearing 66, and the second surface 96 define a second seal gland 184. The first seal gland 182 and the second seal gland 184 are spaced apart from each other by the pair of side surfaces 144 and the top surface 146 of the outer race 140 of the bearing 66.

At least one elastomeric isolator 190, such as an O-ring or the like, is disposed about the outer race 140 of the bearing 66. At least one elastomeric isolator 190 is received within the first seal gland 182 and at least one elastomeric isolator 190 is received within the second seal gland 184.

The at least one elastomeric isolator 190 provides a specific load versus deflection function to yield optimal performance of the rack assembly 22. The at least one elastomeric isolator 190 acts as a member of a ball nut isolation system to provide a preload to the rack assembly 22.

During assembly, component tolerances and build variation may create a wide range of compressions on the at least one elastomeric isolator 190 or the ball nut isolation system. The variation in the compressions on the at least one elastomeric isolator 190 of the ball nut isolation system may result in unacceptable variation in preload that leads to misalignment of the ball nut 68 of a ball nut assembly with respect to its mounting points. The misalignment may lead to additional friction, noise, and loss of mechanical efficiency of the rack assembly 22. In view of these concerns, the injected component 72 is provided to improve robustness to build variation and component tolerances to ensure an optimal load versus deflection function. The injected component 72 is a semisolid material such as an injectable plastic or rubber.

The injected component 72 may be provided instead of the at least one elastomeric isolator 190 or may be provided in concert with the at least one elastomeric isolator 190.

Upon completion of the rack assembly 22 or the completion of the steering assembly 10 and upon confirmation of alignment of the ball screw 64, the injected component 72 is injected through the injection port 120 into the rack assembly 22 to fill voids, absorb tolerances of the mating components, as well as build variation, and reduce lash of the rack assembly 22.

An injection pocket 200 is disposed adjacent to and is in fluid communication with at least one of the first seal gland 182 and the second seal gland 184. The injection pocket 200 is configured to receive the injected component 72. The injection pocket 200 is defined by the first retainer portion 160, the second retainer portion 164, the first step surface 94, the second surface 96, and the chamfered region 112.

In at least one embodiment, at least one of the first retainer portion 160 and the second retainer portion 164 defines a channel 180. The channel 180 extends about a circumference of at least one of the first retainer portion 160 and the second retainer portion 164. In this embodiment, the injection pocket 200 is defined by the first retainer portion 160, the second retainer portion 162, the first step surface 94, the second surface 96, the chamfered region 112, and the channel 180.

The injection port 120 is proximately aligned with the channel 180. The injection port 120 is in fluid communication with the channel 180. The overflow port 122 is in fluid communication with the channel 180. The channel 180 fluidly connects the injection port 120 to the overflow port 122.

The injected component 72 is injected through the injection port 120 and at least partially fills at least one of the channel 180 and the injection pocket 200. The injected component 72 extrudes through a gap between the second retainer portion 164 and the second surface 96 and enters into the first seal gland 182. Should the first seal gland 182 contain an elastomeric isolator 190, the injected component 72 compresses the elastomeric isolator 190 to vary a stiffness of the rack assembly 22 and fills any extra space. The injected component 72 applies an axial load to at least one surface of the elastomeric isolator 192 and applies a radial load to the ball nut 68. The injected component 72 applies a substantially equal diametrical loading to the elastomeric isolators 190.

During the injection process of the injected component 72, air or excess injected component material is able to escape through the overflow port 122. The overflow port 122 may function as a visual indicator such that the visual presence of the injected component 72 proximate the overflow port 122 ensures that the injected component 72 has filled at least one of the first seal gland 182, the second seal gland 184, and the injection pocket 200.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering assembly, comprising:
    a rack assembly coupled to a road wheel, the rack assembly including:

a housing defining an injection port;
a ball screw at least partially received within the housing;
a bearing received within the housing and rotatably supports the ball screw; and
a retainer received within the housing, the retainer including:
  a first retainer portion that cooperates with the housing, and
  a second retainer portion that extends from the first retainer portion and is spaced apart from the housing, the second retainer portion defining a channel and the channel, the second retainer portion, and a surface of the housing defining an injection pocket.

2. The steering assembly of claim 1, wherein the housing defines an overflow port radially spaced apart from the injection port.

3. The steering assembly of claim 1, wherein the injection port is proximately aligned with the injection pocket.

4. The steering assembly of claim 1, further comprising an injected component within the injection pocket through the injection port.

5. The steering assembly of claim 1, further comprising a ball nut coupled to the ball screw and extending through the bearing.

6. The steering assembly of claim 5, wherein the first retainer portion of the retainer and the second retainer portion engages the bearing.

7. A rack assembly provided with a steering assembly, comprising:
a housing having a first step surface extending from a first surface towards a second surface and a bearing shoulder extending from the second surface, the housing defining an injection port extending through at least one of the first step surface and the second surface;
a ball nut disposed on a ball screw that extends through the housing;
a bearing disposed about the ball nut, the bearing includes an outer race that engages the bearing shoulder; and
a retainer disposed about the ball nut, the retainer including:
  a first retainer portion that engages the first surface and the first step surface,
  an inner retainer portion that extends radially from the first retainer portion towards the ball nut, the inner retainer portion engages the ball nut and the outer race, and
  a second retainer portion that extends axially from the first retainer portion, the second retainer portion engages the outer race and is spaced apart from the second surface, the first retainer portion, the second retainer portion, the first step surface, and the second surface defines an injection pocket.

8. The steering assembly of claim 7, wherein at least one of the first retainer portion and the second retainer portion defines a channel.

9. The steering assembly of claim 8, wherein the injection pocket is further defined by the channel.

10. The steering assembly of claim 9, wherein the injection port is proximately aligned with the channel.

11. The steering assembly of claim 10, wherein the housing defines a chamfered region extending between the first step surface and the second surface.

12. The steering assembly of claim 11, wherein the injection port extends through the chamfered region.

13. The steering assembly of claim 7, wherein an end of the second retainer portion, the outer race, and the second surface defines a seal gland.

14. The steering assembly of claim 13, wherein the seal gland is in fluid communication with the injection pocket.

15. The steering assembly of claim 14, further comprising an injected component that is injected into the injection pocket and the seal gland through the injection port.

16. The steering assembly of claim 15, further comprising an elastomeric isolator disposed about the outer race and received within the seal gland.

17. The steering assembly of claim 16, wherein the injected component compresses the elastomeric isolator and varies a stiffness of the rack assembly.

18. A rack assembly provided with a steering assembly, comprising:
a housing having a first step surface extending from a first surface towards a second surface, a chamfered region extending between the first step surface and the second surface, the housing defining an injection port extending through the chamfered region; and
a retainer disposed within the housing, the retainer including:
  a first retainer portion that engages the first surface and the first step surface,
  an inner retainer portion that extends radially from the first retainer portion towards a ball nut disposed about a ball screw, and
  a second retainer portion that extends axially from the first portion, the second retainer portion engages a bearing disposed within the housing, the second retainer portion is spaced apart from the second surface, the first retainer portion and the second retainer portion define a channel and the channel, the second retainer portion, the chamfered region, and the second surface define an injection pocket.

19. The steering assembly of claim 18, wherein an end of the second retainer portion, the second surface, and the bearing define a seal gland disposed adjacent to the injection pocket.

20. The steering assembly of claim 19, further comprising an injected component that is injected through the injection port into at least one of the injection pocket and the seal gland.

* * * * *